July 3, 1962     D. O. LANDON     3,041,920
SPECTROSCOPIC COMPUTER

Filed April 4, 1960     2 Sheets-Sheet 1

*INVENTOR.*
DONALD O. LANDON
BY
ATTORNEY

July 3, 1962
D. O. LANDON
3,041,920
SPECTROSCOPIC COMPUTER
Filed April 4, 1960
2 Sheets-Sheet 2
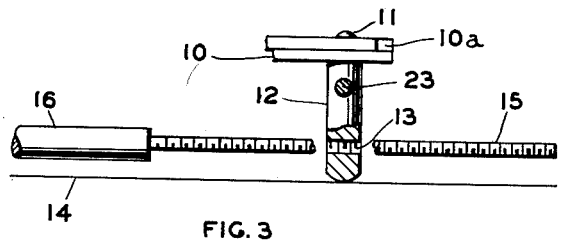
FIG. 3
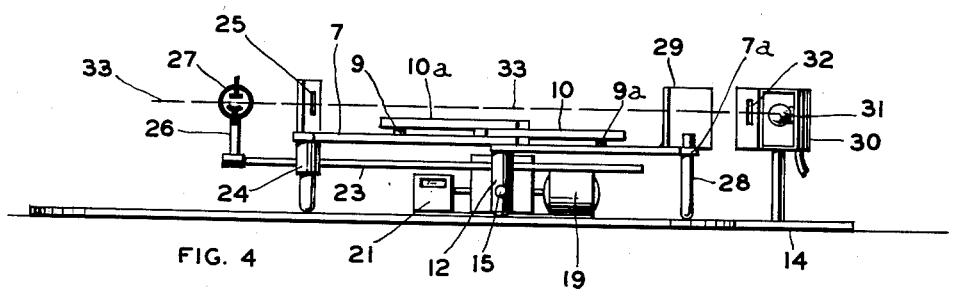
FIG. 4
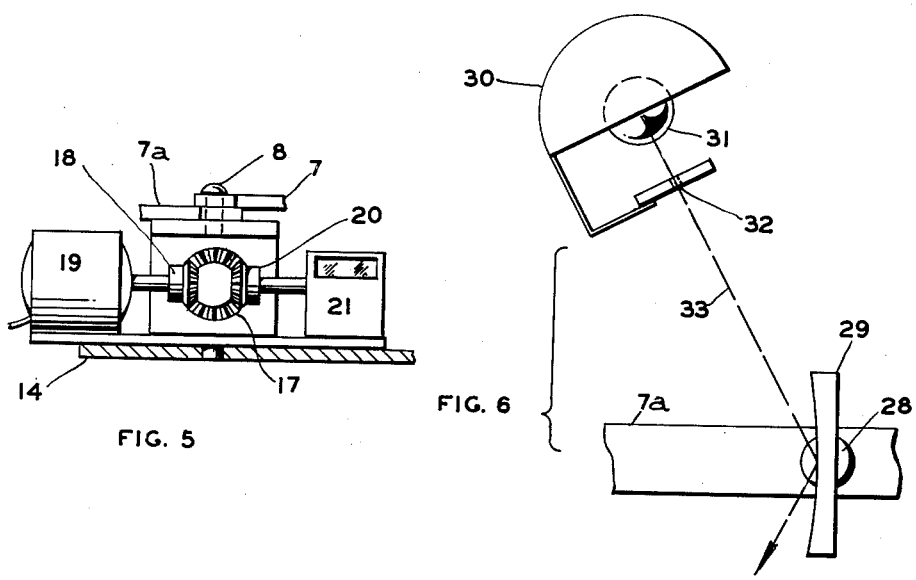
FIG. 5
FIG. 6
INVENTOR.
DONALD O. LANDON
BY
ATTORNEY divide
3,041,920
SPECTROSCOPIC COMPUTER
Donald O. Landon, Summit, N.J., assignor to Spex Industries, Inc., Scotch Plains, N.J., a corporation of New York
Filed Apr. 4, 1960, Ser. No. 19,930
1 Claim. (Cl. 88—14)

My invention relates to a spectroscopic computer and more particularly to an instrument for analysis of light in terms of wavelength.

One of the objects of my invention is to provide an instrument which automatically analyzes light rays and records such analysis automatically, all without the necessity of touching the instrument; this being of extreme importance where the instrument is used to measure and record light days in a vacuum.

Another object of my invention is to provide an instrument which not only will measure light days at grazing angles of incidence on a diffraction grating but which will also make such measurements at normal or direct incidences.

Another object of my invention is to provide a device which will automatically measure directly in angstrom units the wavelengths of diffracted light.

Other objects and advantages of my invention will be apparent from the specifications and the drawings in which:

FIG. 3 is a side elevation of the drive rod portion of the computer.

FIG. 4 is a side elevation of the computer shown in FIGS. 1 and 2.

FIG. 5 is a side elevation of the drive mehcanism and the recording device.

FIG. 6 is an enlarged view of the light beam source and the optical grating used in the instrument.

Figure 1:
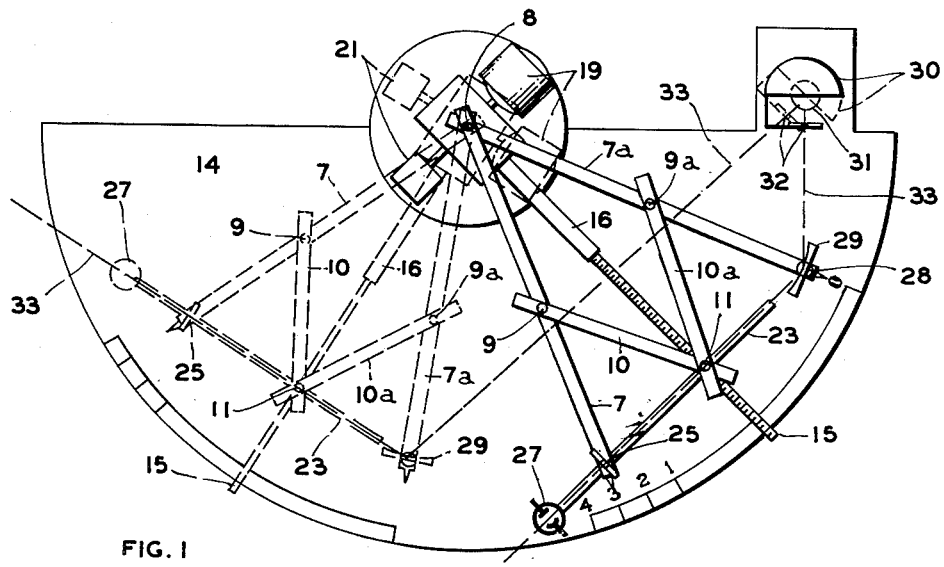
FIG. 1 is a top plan view of my spectroscopic computer showing its position at a grazing angle of incidence in full line and its dotted line position showing the instrument positioned to measure normal or direct line observation.
Figure 2:
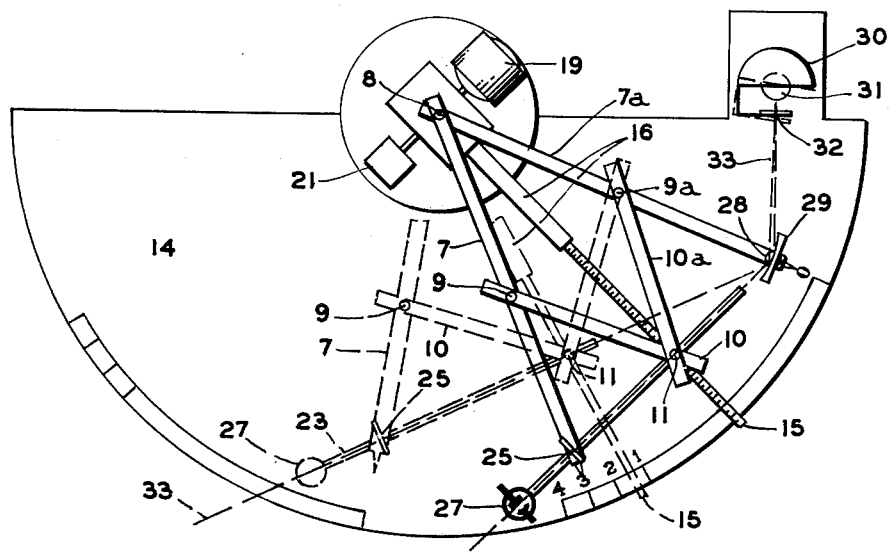
FIG. 2 is a top plan view of the instrument with the dotted lines showing its physical method of computing in grazing incidence.

Referring to the drawings, 7 and 7a are arms of equal length pivoted at 8, and, as such, physically represent two sides of a triangle. Arms 7 and 7a at equal distances from pivot 8 have pivoted to them at 9 and 9a, arms of equal length 10 and 10a their opposite ends being pivoted together at 11, said latter pivot being connected to a stud 12 female threaded at 13. Stud 12 rests on and moves along the surface of calculator base 14 whose arc is measured in known angstrom or wavelength increments.

Threaded through female threaded orifice 13 is male threaded drive arm 15, journaled in coupling 16 and terminating in bevel gear 17, said bevel gear being intermeshed with bevel gear 18 connected to a reversible rotary source of power 19 and also connected to bevel gear 20 attached to a rotation counter 21 whose purpose is to count the revolutions of drive arm 15 through the media of coupling 16 and gear 17.

Referring again to stud 12, there is bored at a convenient point, above female threaded orifice 13, a smooth bore orifice at right angles to rod 15 and adapted to receive and slidably hold rod 23 which near its opposite end is firmly transfixed to a rotatable stud 24 resting at one end on base 14 and at the other end supporting exit slit 25. Rod 23 also near its end supports an adjustable bracket 26 adapted to hold any type of detecting device 27 which might be a photoelectric cell as depicted here.

Equidistant from pivot 8 on arm 7a as the distance from pivot 8 to exit slit 25, there is mounted stud 28, whose lower end rests on base 14 and whose upper portion carries an optical grating 29, such as is well known to those skilled in the art. Grating 29 is firmly mounted over stud 28 at right angle to arm 7a with its concave surface having its center over the center of stud 28. The radius of curvature of grating 29 is exactly equal to twice the length of arm 7 or 7a measured from 8 to 25 or 28.

It may now be seen that rod 23 represents a portion of the base of a triangle represented by 7, 7a and an extension of rod 23, so that no matter what the length of the base of the triangle is, radiation diffracted from grating 29 and passing through exit slit 25 will always impinge upon detector 27 and in addition exit slit 25 will always remain perpendicular to the optical line of sight from 29 along 23 through 25 to 27, because rod 23 slides in the right angled orifice 13 thus always turning pivot stud 24 and exit slit 25 so that mechanically I have established a line of sight triangle base.

In a rotatable housing 30 I place a light source 31 in front of which is entrance slit 32, which allows light to be emitted in a narrow beam indicated by numeral 33; thus with the light source and computer shown in full line of FIG. 1, the instrument is set up for measuring light rays at a grazing angle of incidence and in the same figure, as shown in dotted line, the light source has been turned and the instrument set up measure light rays at a normal or direct angle of incidence.

At this point I wish to state that while I have shown a light source which may be swiveled, it would be no departure from my invention to leave the computer as set up in full line of FIG. 1 and move the light source to a different location to obtain direct or normal angles of incidence measurements.

Operation

The light source 31 is turned on and the motor 19 run in such a direction that arms 7 and 7a approach each other. When the arms are suitably closed the motor is stopped and the arm 7a, carrying with it all the components of the computer arms, is moved on base 14 until the angle included between the line 33 and the line between 8 and the center of 29 is as desired. This angle is called the angle of incidence or alpha angle while the angle included between the base line and the line between 8 and the center of 29 is called the angle of diffraction or beta angle.

Arm 7a is now locked to base 14 by any suitable means, and motor 19 is again turned on, this time so that arm 7 moves away from 7a until the direct or undiffracted image is coincident with slit 25. This then is the zero wavelength point and the counter 21 is now set to read zero revolutions.

Once this adjustment is made the counter, when the motor is again turned on, will read in figures directly proportional to wavelength, regardless of the particular angle of incidence that has been selected. Since the proportionality is always the same for a given diffraction grating, the instrument can be made to read wavelength directly on the counter or other recording device through appropriate ratio control.

It may now be seen that since the wavelength of diffracted light is proportional to the sine of the angle of incidence (alpha) plus or minus the sine of the angle of diffraction (beta), I have converted this into a function which may be read off in revolutions of the shaft 16 and recorded on counter 21; so that in effect I have invented a mechanism that is actually a sine drive.

I wish to point out here that, if desired, the recording device 27, which might be a camera lens, may replace slit 25 so that multiple spectra may be photographically recorded.

It will also be apparent to those skilled in the art that minor changes may be made in my invention without departing from its scope as for example: Rod 23 may pivot at 11 and slide at 24 instead of operating as shown.

I claim:

In a spectroscopic computer, a computer base, a light source and a slit movably mounted on said base, two arms of equal length each having one end connected to a common pivot on said base, an optical grating carried at the other end of one of said arms and an exit slit carried at the other end of the other of said arms, two additional arms each having one end pivotally connected to the center of one of said two arms and another end commonly, pivotally connected to a drive element, a drive rod connected to said drive element and to a counter, a reversible power source connected to said drive rod, a rod pivotally connected to another end of one of the first said arms and slidably connected to said drive element, said first two and last said rod forming the sides and base of a triangle respectively; whereby, upon activation of said power source, the length of the base of said triangle is changed such that the wavelength of the light diffracted through said exit slit is proportional to the sine of the angle of incidence of the light on said grating plus the sine of the angle between the base and the side of the triangle formed by the arm carrying said grating, and means for recording variations in said diffracted beam.

References Cited in the file of this patent

"Telescoptics," Ingalls, article published in Scientific American, March 1944, pages 140, 141.